(12) United States Patent
Mukai et al.

(10) Patent No.: US 7,286,745 B1
(45) Date of Patent: Oct. 23, 2007

(54) PROVIDING A CAPABILITY TO SORT CONTENTS DATA AND TO MAINTAIN A CURRENT SORTING MODE

(75) Inventors: Tsuguhiro Mukai, Kanagawa (JP); Shigeho Ogawa, Kanagawa (JP); Mitsuhiko Awata, Tokyo (JP); Kenji Fukumoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/563,376

(22) Filed: May 3, 2000

(51) Int. Cl.
*H04N 5/93* (2006.01)

(52) U.S. Cl. .......................................... 386/52; 386/95

(58) Field of Classification Search .................. 386/1, 386/45–46, 95, 125, 126
See application file for complete search history.

(56) References Cited

U.S. PATENT DOCUMENTS

| | | | | |
|---|---|---|---|---|
| 5,481,509 A | * | 1/1996 | Knowles | 386/117 |
| 5,701,385 A | * | 12/1997 | Katsuyama et al. | 386/106 |
| 5,751,672 A | * | 5/1998 | Yankowski | 709/238 |
| 5,793,366 A | * | 8/1998 | Mano et al. | 345/839 |
| 5,889,746 A | * | 3/1999 | Moriyama et al. | 369/30.03 |
| 5,940,232 A | * | 8/1999 | Okuyama | 360/15 |
| 5,963,704 A | * | 10/1999 | Mimura et al. | 386/95 |
| 6,034,925 A | * | 3/2000 | Wehmeyer | 369/30.28 |
| 6,035,091 A | * | 3/2000 | Kazo | 386/46 |
| 6,118,450 A | * | 9/2000 | Proehl et al. | 715/810 |
| 6,160,952 A | * | 12/2000 | Mimura et al. | 386/95 |
| 6,275,451 B1 | * | 8/2001 | Park et al. | 386/106 |
| 6,289,169 B1 | * | 9/2001 | Okuyama | 386/83 |
| 6,313,812 B1 | * | 11/2001 | Nagano et al. | 345/2.1 |
| 6,314,426 B1 | * | 11/2001 | Martin et al. | 707/100 |
| 6,344,880 B1 | * | 2/2002 | Takahashi et al. | 348/563 |
| 6,415,098 B1 | * | 7/2002 | Taira | 386/70 |
| 6,445,877 B1 | * | 9/2002 | Okada et al. | 386/95 |
| 6,462,753 B1 | * | 10/2002 | Koyata et al. | 345/716 |
| 6,481,011 B1 | * | 11/2002 | Lemmons | 725/47 |
| 6,483,548 B1 | * | 11/2002 | Allport | 348/564 |

\* cited by examiner

*Primary Examiner*—Huy Nguyen
(74) *Attorney, Agent, or Firm*—Frommer Lawrence & Haug LLP; William S. Frommer; Thomas F. Presson

(57) ABSTRACT

A reproducing apparatus is disclosed, that has at least one record medium on which contents data and related information thereof are recorded, for handling the contents data and the related information, the record medium being attachable to and detachable from the reproducing apparatus and that comprises a reading means for reading the related information from the record medium, a storing means for storing the related information that is read from the record medium, and a graphical user interface means having a displaying means for displaying the related information stored in the storing means.

30 Claims, 16 Drawing Sheets

Fig. 12

| ALL | DVD | CD | A | B | C | D |

30 | | | CD

DISC MEMO INPUT

48 — Brahms Symphon

ABCDEFGHIJKLMNOPQRSTUVWXYZ
abcdefghijklmnopqrstuvwxyz — 49
0123456789 ~ + − * ／ = ＼ < > ( ) [ ] { }
: ; . , ! " # $ % & ' ` ^ | ? _ @

[← ↑ ↓ →]→[ENTER] Cancel : [RETURN]
[← ↑ ↓ →]→[ENTER] Cancel : [RETURN]   Edit — 46

PROVIDING A CAPABILITY TO SORT CONTENTS DATA AND TO MAINTAIN A CURRENT SORTING MODE

BACKGROUND OF THE INVENTION

1. Field of the Invention

The present invention relates to a reproducing apparatus and a reproducing method that allow contents data to be searched from a disc accommodated in a disc changer or reproduced therefrom with an improved operability.

2. Description of the Related Art

A disc changer having many disc loading slots that allow one selected from discs accommodated therein and contents data to be reproduced from the selected disc is known. As such discs, CDs (Compact Discs: registered trademark), video CDs, DVDs (Digital Versatile Discs or Digital Video Discs) are used. When the number of discs that are accommodated to the disc changer amounts to several tens or several hundreds, it will be difficult for the user to search his or her desired video contents or audio contents. Thus, when each disc contains data text information that represents the contents thereof as well as contents, the user can search a desired disc using the text information. When each disc does not contain such text information, the user inputs text information and stores it in a memory of a reproducing apparatus so that the input text information correlates with the disc and the slot number.

In reality, information such as a disc title is read from an accommodated disc or text information that the user has input is displayed on a displaying unit. While watching the text information on the displaying unit, the user searches a desired disc and selects it. As an example of such a displaying unit, a CRT (Cathode Ray Tube) or a light emission diode that displays a character string of one line or several lines has been used.

However, with such insufficient information, it is difficult for the user to distinguish a desired one from many discs.

OBJECTS AND SUMMARY OF THE INVENTION

Therefore, an object of the present invention is to provide a reproducing apparatus and a reproducing method that allow the user to easily search a proper disc that contains his or her desired contents from many discs accommodated in for example a disc changer.

To solve the above-described problem, a first aspect of the present invention is a reproducing apparatus, having at least one record medium on which contents data and related information thereof are recorded, for handling the contents data and the related information, the record medium being attachable to and detachable from the reproducing apparatus, comprising a reading means for reading the related information from the record medium, a storing means for storing the related information that is read from the record medium, and a graphical user interface means having a displaying means for displaying the related information stored in the storing means.

A second aspect of the present invention is a reproducing method of a reproducing apparatus, having at least one record medium on which contents data and related information thereof are recorded, for handling the contents data and the related information, the record medium being attachable to and detachable from the reproducing apparatus, the reproducing method comprising the steps of reading the related information from the record medium, storing the related information that is read from the record medium, and displaying the stored related information with a graphical user interface.

Since information of accommodated record mediums is presented to the user through a graphical user interface with improved visibility, the record mediums can be easily managed. Thus, the operability of the reproducing operation for the record mediums can be improved.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 12 is a schematic diagram showing an example of a screen for explaining a text information inputting process according to the embodiment of the present invention;

DETAILED DESCRIPTION OF THE PREFERRED EMBODIMENTS

Figure 1:
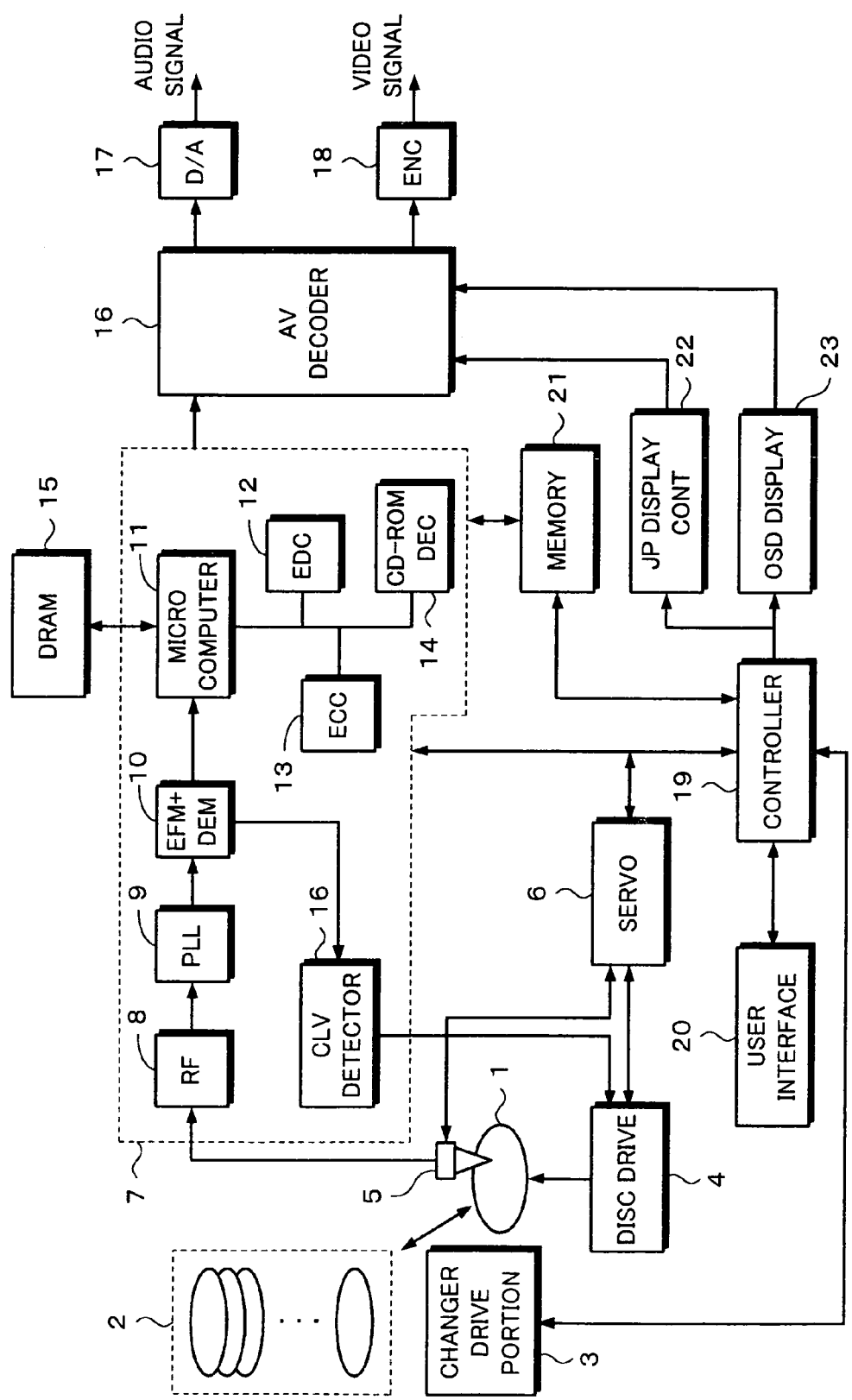
FIG. 1 is a block diagram showing the overall structure of a system according to an embodiment of the present invention.

Next, with reference to the accompanying drawings, an embodiment of the present invention will be described. FIG. 1 shows an outline of the overall structure of a disc changer according to the embodiment of the present invention. In FIG. 1, reference numeral 1 is a disc. The disc 1 is an optical disc such as a DVD video disc, a CD, or a video CD.

Reference numeral 2 is a disc accommodating portion. The disc accommodating portion 2 has many numbered-slots that accommodate discs (for example, DVDs) one by one. The disc accommodating portion 2 is controlled by a changer driving portion 3. One disc (disc 1) with a designated slot number is loaded from the disc accommodating portion 2 to a disc driving portion 4 in such a manner that the disc 1 is rotated by the disc driving portion 4.

Information recorded on the disc 1 is optically read by an optical head 5. Pits corresponding to record information are formed on spiral tracks of the disc 1. The optical head 5 radiates a laser beam to the disc 1. The reflected light is detected by an optical detector. Thus, the information recorded on the disc 1 is read. When the disc 1 is a DVD video disc, video information that has been compressed corresponding to variable bit rate MPEG 2 (Moving Picture Experts Group Phase 2) format, audio information that has been compressed corresponding to linear PCM or AC-3 compression data format, and auxiliary information such as a sub picture (sub title information) or control information are recorded.

The driving portion 4 has a spindle motor and a feed motor. The spindle motor rotates the disc at CLV (Constant Linear Velocity). The feed motor radially feeds the disc. A servo portion 6 controls the spindle motor and the feed motor of the driving portion 4. In addition, the servo portion 6 controls the tracking operation and the focusing operation of the optical head 5.

Information (reproduction signal) that is read from the disc 1 by the optical head 5 is supplied to a reproduction signal processing portion 7 that is a circuit block surrounded by dotted lines. The reproduction signal is supplied to an RF portion 8. The RF portion 8 has a pre-amplifier, an equalizer, and so forth. An output signal of the RF portion 8 is supplied to a PLL (Phase Locked Loop) 9. The PLL 9 performs a synchronous detecting process and an A/D converting process for the signal received from the RF portion 8. An output signal of the PLL 9 is supplied to an EFM+ (plus) demodulating portion 10. The EFM+ plus demodulating portion 10 demodulates a signal that has been modulated corresponding to EFM+ system. The EFM+ system is a digital modulating system of which data of eight bits is converted into a code of 16 bits corresponding to a predetermined rule.

The EFM+ demodulating portion 10 is connected to a CLV detector 16. The CLV detector 16 extracts a signal necessary for performing a CLV controlling process. The extracted signal is supplied to a disc driving portion 4. An error detecting process, an error correcting process, and a CD-ROM decoding process are performed for the demodulated data by a microcomputer 11, an error detecting portion 12, an error correcting portion 13, and a CD-ROM decoder 14. The error detecting portion 12, the error correcting portion 13, and the CD-ROM decoder 14 are controlled by the microcomputer 11. The microcomputer 11 is connected to a DRAM 15 as a large storage memory. In this example, the disc changer can reproduce contents data from a CD, a CD extra disc, a CD-ROM, and so forth as well as a DVD video disc. Thus, the disc changer according to the embodiment has a CD-ROM decoder 14.

The reproduction data that is output from the reproduction signal processing portion 7 is supplied to an AV (video and audio) decoder 16. As will be described later, the AV decoder 16 decodes the reproduction data and generates a digital audio signal. In addition, the AV decoder 16 decodes the reproduction data and generates digital video data. The digital audio data is supplied to a D/A converter 17. The D/A converter 17 converts the digital audio data into an analog audio signal. The analog audio signal is reproduced by a speaker (not shown) through an audio amplifier (not shown). The digital video data is supplied to an encoder 18. The encoder 18 converts the digital video data into for example an analog NTSC video signal. The analog video signal is supplied to and reproduced by a monitor (not shown).

Reference numeral 19 is a controller that controls the overall disc reproducing system. The controller 19 controls the changer driving portion 3, the servo portion 6, and the reproduction signal processing portion 7. The controller 19 is connected to a user interface 20. In reality, the user interface 20 is composed of a remote controller, a keyboard, and a mouse.

Reference numeral 21 is a storing portion. The storing portion 21 is controlled by the controller 19. The storing portion 21 is a non-volatile memory. The storing portion 21 stores a still picture that represents the contents of each disc accommodated in the disc accommodating portion 2. For example, a picture of a jacket of each DVD video disc is stored in the storing portion 21 (this picture is referred to as jacket picture). One type of DVD video discs has a dedicated area for the jacket picture along with a video contents record area for a movie or the like. The jacket picture data is written from the reproduction signal processing portion 7 to the storing portion 21 under the control of the controller 19. The jacket picture data that is read from the storing portion 21 is supplied to the AV decoder 16 through the reproduction signal processing portion 7.

In addition, the controller 19 controls a jacket picture (JP) displaying controller 22 so as to control a displaying process for the jacket picture. The controller 19 controls an OSD (On Screen Display) displaying portion 23 so as to generate display data that is displayed on the monitor. The AV decoder 16 superimposes the display data on the reproduction video data. As will be described later, a GUI (Graphical User Interface) is accomplished by the user interface 20 and display data displayed on the monitor.

Figure 2:
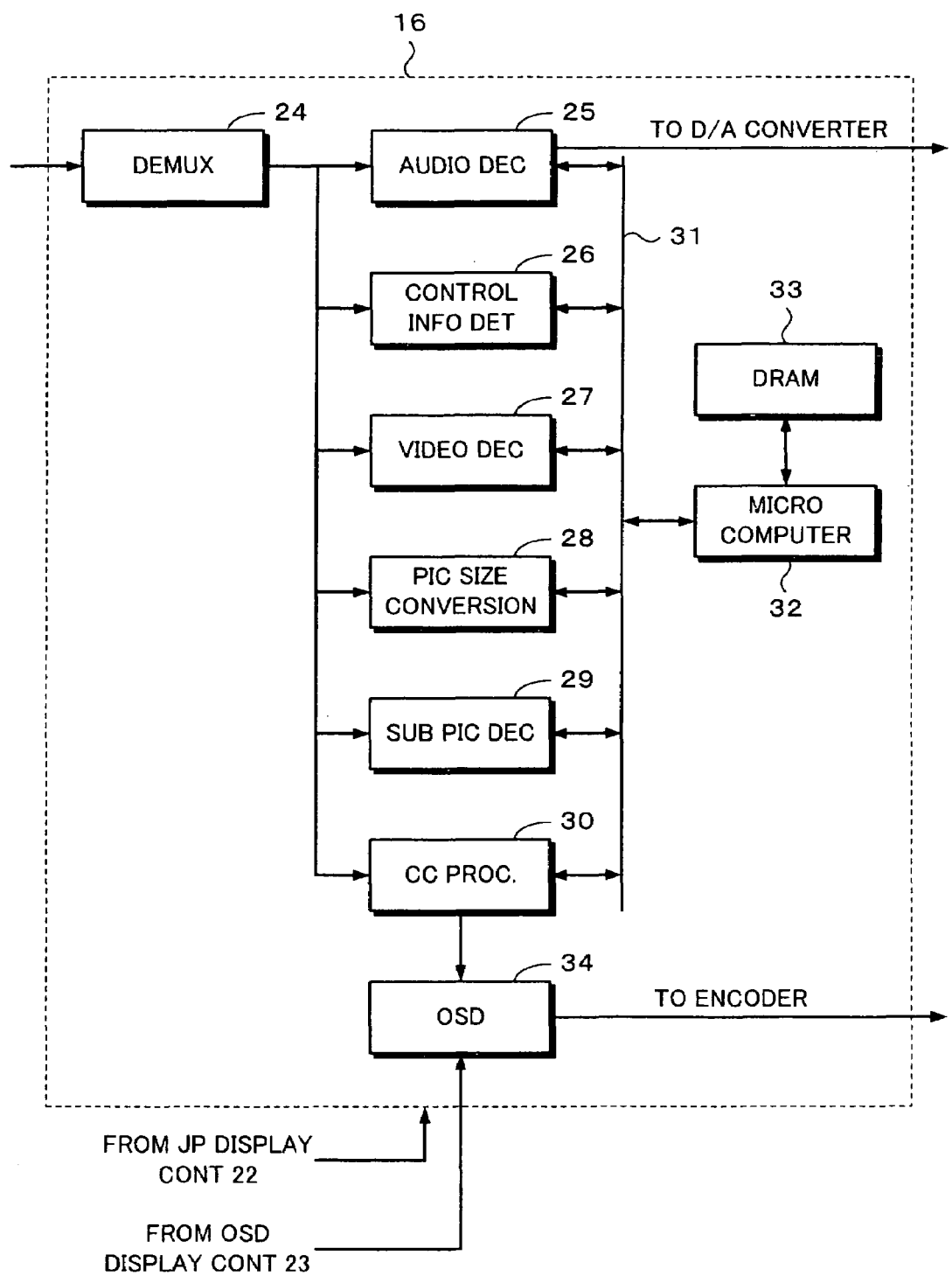
FIG. 2 is a block diagram showing an example of the structure of an AV decoder shown in FIG. 1.

FIG. 2 shows an example of the structure of the AV decoder 16 in the case that the disc 1 is a DVD video disc. The reproduction digital data that is output from the reproduction signal processing portion 7 is supplied to a demultiplexer 24. The demultiplexer 24 demultiplexes the reproduction digital data into a video stream, an audio stream, a sub picture stream, a jacket picture stream, and so forth. The audio stream is supplied to an audio decoder 16. The audio decoder 16 decodes the audio stream. When the disc 1 is a DVD, the audio decoder 25 decodes the audio stream corresponding to AC3 method. The digital audio data that is output from the audio decoder 25 is supplied to the D/A converter 17 (see FIG. 1).

A control information detecting portion 26 detects control information necessary for processing the video stream, the sub picture stream, and so forth. A video decoder 27 decodes the video stream that has been encoded corresponding to the MPEG 2 method. As with the video stream, the video decoder 27 decodes the jacket stream. A picture size converting portion 28 converts the aspect ratio of the video stream. For example, the picture size converting portion 28 converts a picture having an aspect ratio of 16:9 into a picture having an aspect ratio of 4:3. A sub picture decoder 29 decodes the sub picture stream and outputs sub title information. A closed caption processing portion 30 processes closed caption information contained in the video stream.

The above-described processing portion that processes pictures is connected to a microcomputer 32 through a CPU bus 31. The microcomputer 32 controls a process for a picture using a DRAM that is a buffer memory. The digital video data decoded by the video decoder 27, the sub picture decoded by the sub picture decoder 29, and the closed caption that is output from the closed caption processing portion 30 are supplied to an OSD portion 34. The OSD displaying portion 23 (see FIG. 1) supplies display information to the OSD portion 34.

According to the embodiment, the controller 19 obtains disc ID information as information for identifying individual discs. When the disc 1 is a DVD, as the disc ID information, VMGI/VMGI_MAT/VMG_EA and VSTI/VSTI_MAT/VTS_EA of VTS#1 are used. When the disc 1 is a video CD or a CD-extra disc, the maximum track number and read-out start time (sector number) are used. When the disc 1 is a CD, the total of program times (minute, second, and frame) may be used. This is because the program time varies in each CD. A CD extra disc is a multi-session disc having an audio CD area and a CD-ROM area.

Figure 3:
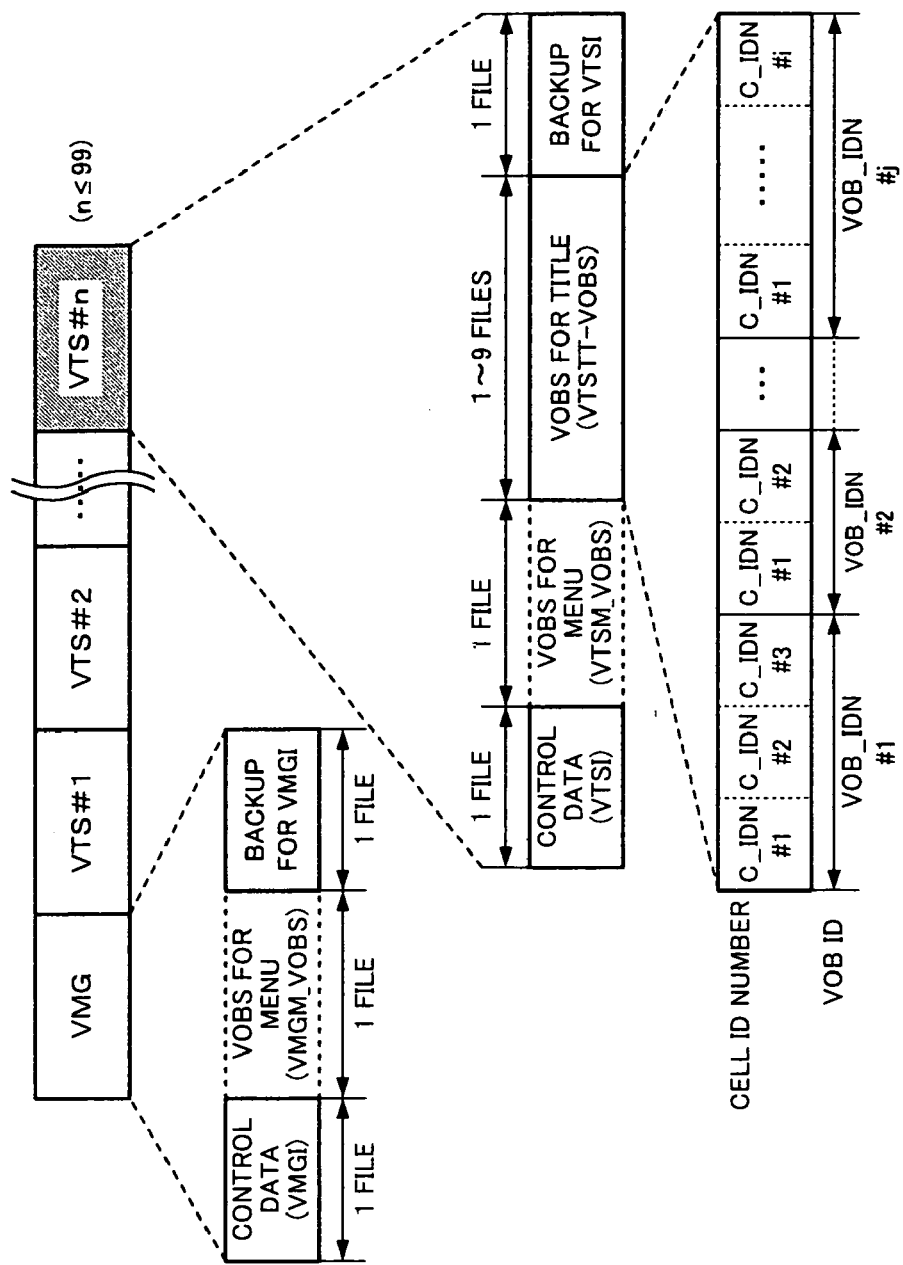
FIG. 3 is a schematic diagram for explaining the data structure of a DVD according to the present invention.

Next, the data structure of a DVD video disc will be described with reference to FIG. 3. A set of video objects composed of video data, audio data, sub picture data, and so forth is referred to as VOBS. VOBS is recorded to adjacent blocks or interleaved blocks. VOBS is composed of at least one VOB. FIG. 3 shows an example of which all VOBs are recorded to adjacent blocks.

VOBS is composed of at least one cell. C_IDN (cell ID number) is assigned to each cell of VOBS in the ascending order. Each cell of each VOB is identified with VOB_IDN (VOBID number) and C_IDN.

VMG is composed of a control data file VMGI, a menu-added file VMGM_VOBS, and a backup file of VMGI. VMGI_MAT is added at the beginning of VMGI. VMGI_MAT contains VMGI_ID and VMGI_EA (end addresses) (not shown).

VTS is composed of control data VTSI, a menu-added file VTSM_VOBS, a title VTSTT_VOBS of VOBS, and a backup file of VTSI. VTSI_MAT (not shown) is added at the beginning of VTSI. VTSI_MAT contains VTS_ID and VTS_EA (end address).

The disc ID information is read from the disc 1 and stored to the storing portion 21 (shown in FIG. 1) under the control of the controller 19. Whenever contents data is reproduced from the disc, the controller 19 determines whether or not the disc is a new disc corresponding to the disc ID information.

When the controller 19 determines that the disc is a new disc corresponding to the disc ID information, the controller 19 reads the following information from the disc and stores the obtained information to the storing portion 21.

When the disc 1 is a DVD video disc, the controller 19 obtains a jacket picture and a title name of the DVD text from the disc.

When the disc 1 is a video CD, the controller 19 obtains a jacket picture and a disc title of a CD-text information from the disc.

The jacket picture is stored corresponding to the slot of the disc accommodating portion 2. Thus, a number of jacket pictures corresponding to the number of slots of the disc accommodating portion 2 are stored to the storing portion 21.

According to the embodiment of the present invention, since the storing portion 21 is a non-volatile memory, after the power of the reproducing apparatus is turned on, it is not necessary to read information of all discs accommodated in the disc accommodating portion 2. In addition to the information of discs, another information for structuring a GUI environment for allowing the user to search his or her desired disc and to reproduce it on a screen of the monitor is stored to the storing portion 21. This information is referred to as changer disc information. The changer disc information is composed of information of each disc and folder setup information.

The information of discs can be stored for the number of discs that can be accommodated to the disc changer. The information of disc is composed of:

Disc type information (for identifying a DVD, a CD, or a video CD),

Presence/absence of jacket picture,

Presence/absence of text information and memo information,

Genre setup, and

Folder information (for identifying a folder to which a disc is filed). Each disc can be filed to a plurality of folders.

The folder setup information is composed of:

Folder name information (the user can assign a name to a folder), and

Sorting mode. (The last sorting mode displayed with the GUI is stored for each folder. There are three types of sorting modes that are a disc number sorting mode, a text sorting mode, and a genre sorting mode.)

When the power of the reproducing apparatus is turned on, the controller 19 reads the changer disc information from the storing portion 21 and copies it to the RAM of the controller 19. In a process for displaying the GUI, the information stored in the RAM is used.

For example, when a disc is accommodated to or removed from the disc accommodating portion 2 or when the user inputs a memo, the changer disc information may be updated. Whenever the changer disc information is updated, if the information stored in the storing portion is rewritten, the load of the process of the controller 19 increases. To solve such a problem, while the power is turned on, only the information stored in the RAM is updated, not information stored in the storing portion 21. When the controller 19 receives a turn off request from the user interface 20, the latest disc changer information stored in the RAM is written to the storing portion 21.

Next, the GUI according to the embodiment of the present invention will be described in detail. FIGS. 4, 7, 8, 9, 11, 14, and 16 are flow charts showing controlling operations of the controlling portion mainly composed of the controller 19. FIGS. 5, 6, 10, 12, 13, and 15 are schematic diagrams showing screens corresponding to the controlling operations of the controlling portion.

Figure 4:
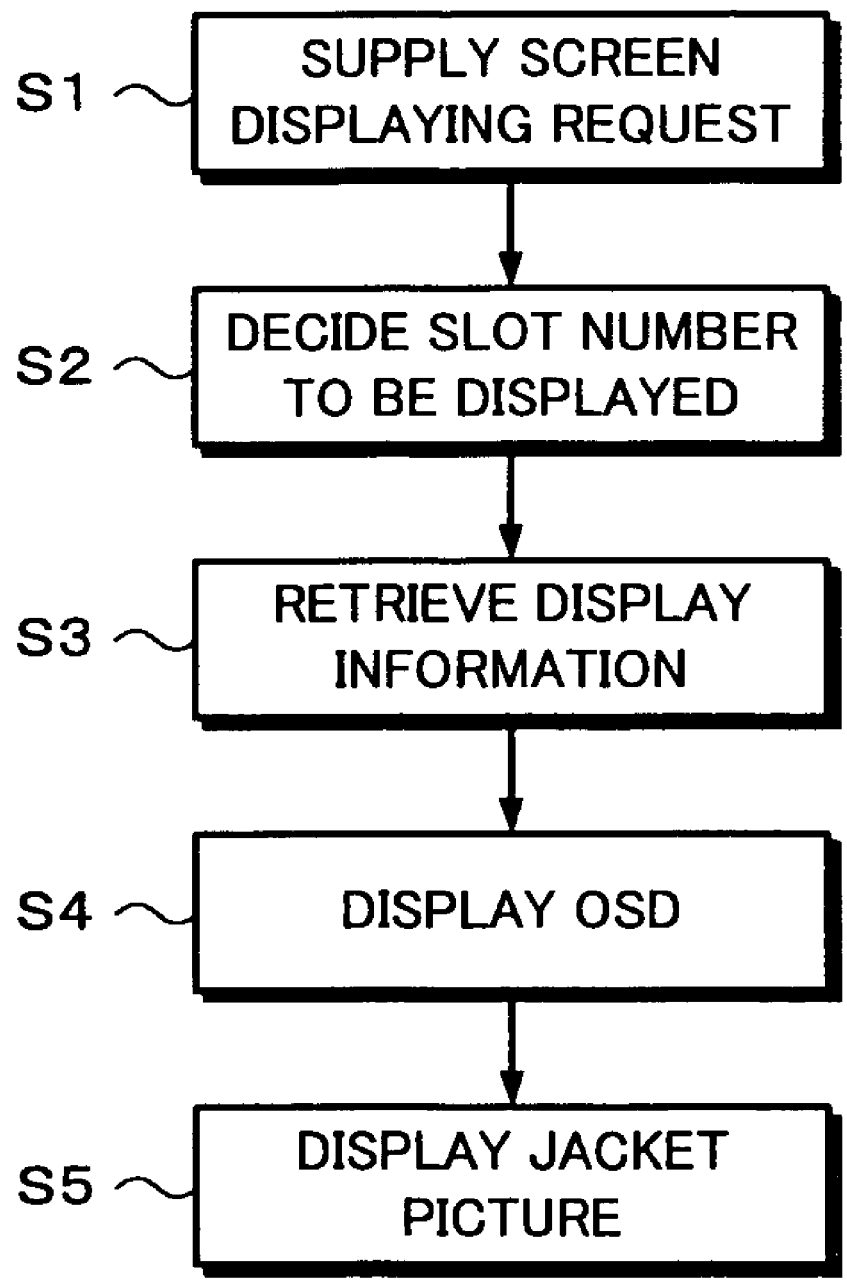
FIG. 4 is a flow chart for explaining a screen displaying process according to the embodiment of the present invention.

First of all, with reference to FIGS. 4 and 5, a displaying process for a GUI screen will be described. At step S1 shown in FIG. 4, when a displaying request takes place through the user interface 20, the user interface 20 supplies screen information and the displaying request to the controller 19. The screen information is composed of:

Folder information: ALL, DVD, CD, A, B, C, and D

Start slot number.

The display contents vary corresponding to folder information as follows:

ALL: Displays all discs that are accommodated.

DVD: Displays a DVD disc.

CD: Displays a video CD or a CD.

A/B/C/D: Displays discs filed in individual folders.

"A" to "D" are folders designated with buttons of the user interface 20 (for example, remote controller).

There are three types of sorting modes:

Slot number: Displays slot numbers in the ascending order.

Text: Displays texts in the alphabetical order.

Genre: Displays genres in the alphabetical order.

The user designates a desired sorting mode with the user interface 20. When two discs have the same text and the same genre, they are displayed in the order of slot numbers.

The controller 19 decides a slot number to be displayed corresponding to the screen information and the sorting mode of each folder (at step S2).

The controller 19 retrieves display information corresponding to the decided slot number from the memory (at step S3). As was described above, the disc type information, the genre setup, and the text information of each disc are display information.

The controller 19 supplies the display information to the OSD displaying portion 23. In addition, the controller 19 supplies both a slot number to be displayed and a jacket picture displaying request to the jacket picture displaying controller 22.

At step S4, the OSD displaying portion 23 supplies a display signal corresponding to the display information to the OSD displaying portion 23 so that the OSD portion 34 displays a frame, a disc type, a genre setup, text information, a highlighted area, and so forth. At step S5, a jacket picture is displayed.

The data of the jacket picture is read from the storing portion 21 and supplied to the AV decoder 16 through the reproduction signal processing portion 17. The data of the jacket picture is decoded by the video decoder 27 and then supplied to the OSD portion 34. The controller 19 and the jacket picture displaying controller 32 control the OSD portion 34 so as to display a jacket picture corresponding to the designated slot number.

Figure 5:
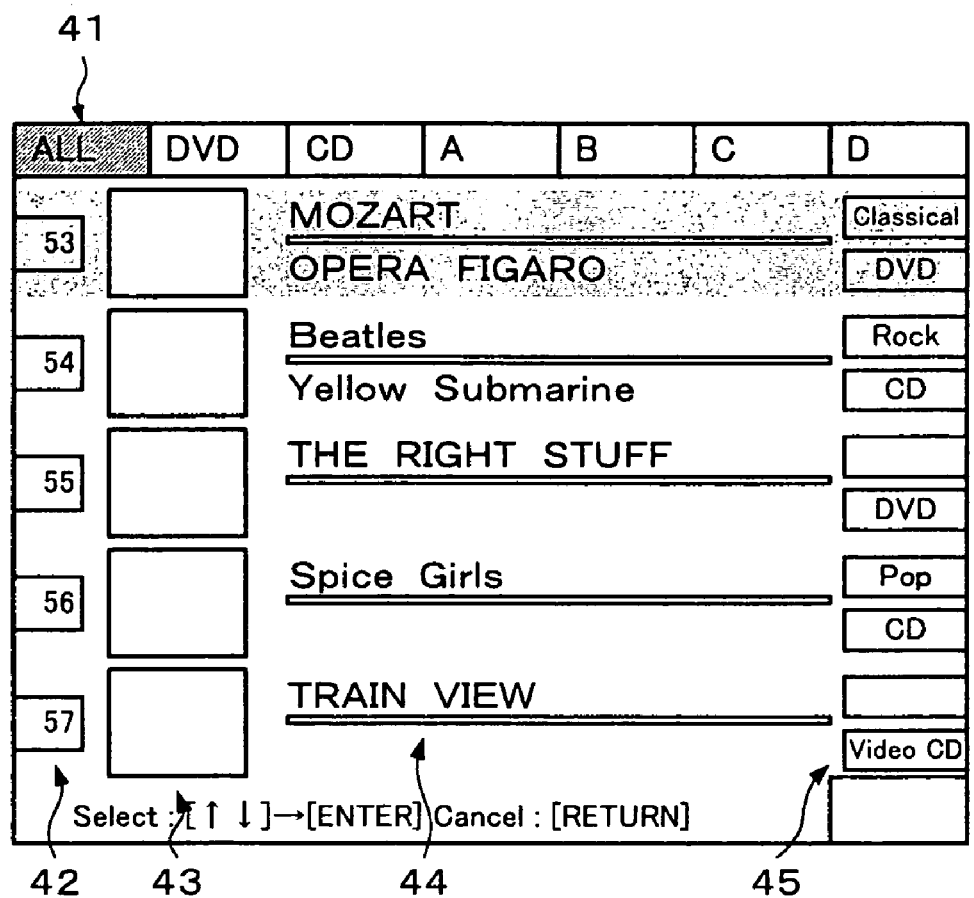
FIG. 5 is a schematic diagram showing an example of a screen for accomplishing a GUI according to the embodiment of the present invention.

FIG. 5 is an example of the OSD screen that takes place at step S4. The OSD screen has the following areas that are framed.

A folder displaying area 41 is placed as a bar at an upper portion of the OSD screen. In the example shown in FIG. 5, the "ALL" folder has been selected. The "ALL" folder is highlighted in such a manner that the color and brightness of the "ALL" folder are different from those of the other folders.

A displaying area 42 has slot numbers arranged in the vertical direction. In the example shown in FIG. 5, five slot numbers can be displayed at a time. With a scrolling operation, slot numbers can be scrolled.

A jacket picture displaying area 43, a text displaying area 44, a genre/disc type information displaying area 45 are displayed corresponding to slot numbers. The genre/disc type information area 45 is placed at a right vertical area. The genre/disc type information displaying area 45 is composed of a genre displaying area (as an upper area) and a disc type displaying area (as a lower area). When a disc accommodated in each slot is blank, no information is displayed in the displaying areas 43, 44, and 45 except for their frames. In the example shown in FIG. 5, information corresponding to the slot number "53" is highlighted.

Figure 6:
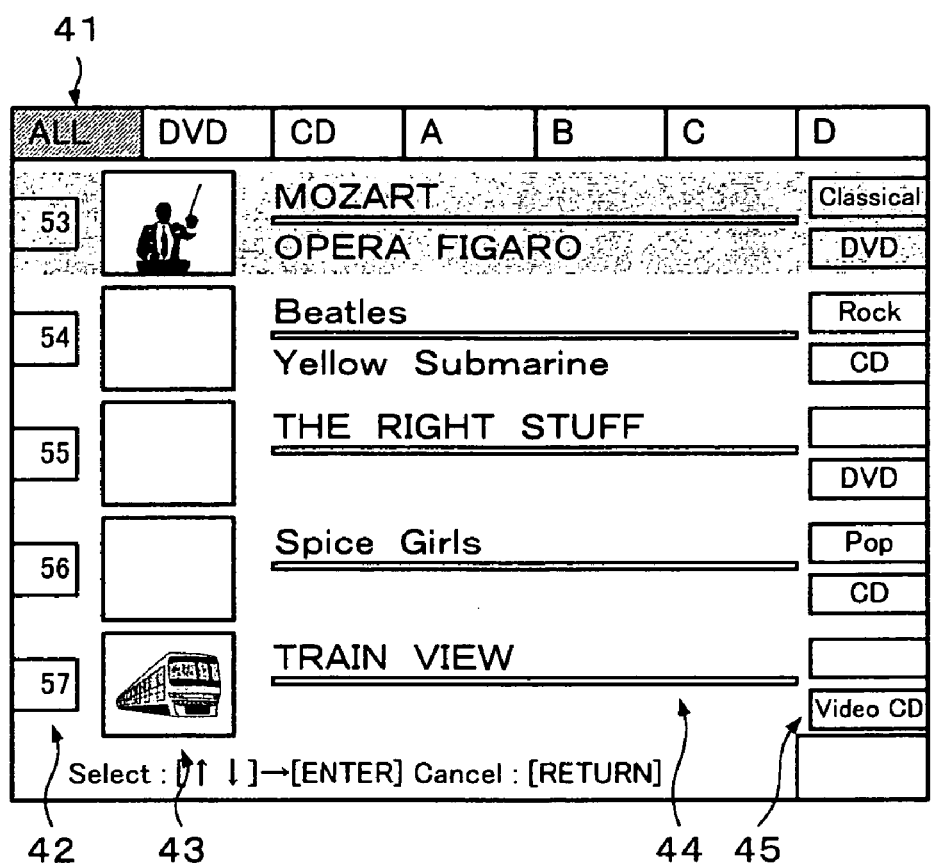
FIG. 6 is a schematic diagram showing an example of a screen for accomplishing the GUI according to the embodiment of the present invention.

FIG. 6 shows an example of a jacket picture displayed at step S5. For example, in the highlighted slot "53", a DVD having related information of (genre: classic, type: DVD, text: MOZART, OPERA FIGARO) is accommodated. A jacket picture recorded on the DVD is displayed. On the other hand, in the slot number "57", a video CD having related information of (genre: none, type: video CD, text: TRAIN VIEW) is accommodated. A jacket picture recorded on the video CD is displayed. Since jacket pictures are not recorded on discs accommodated in the other slots, the jacket pictures are not displayed.

Figure 7:
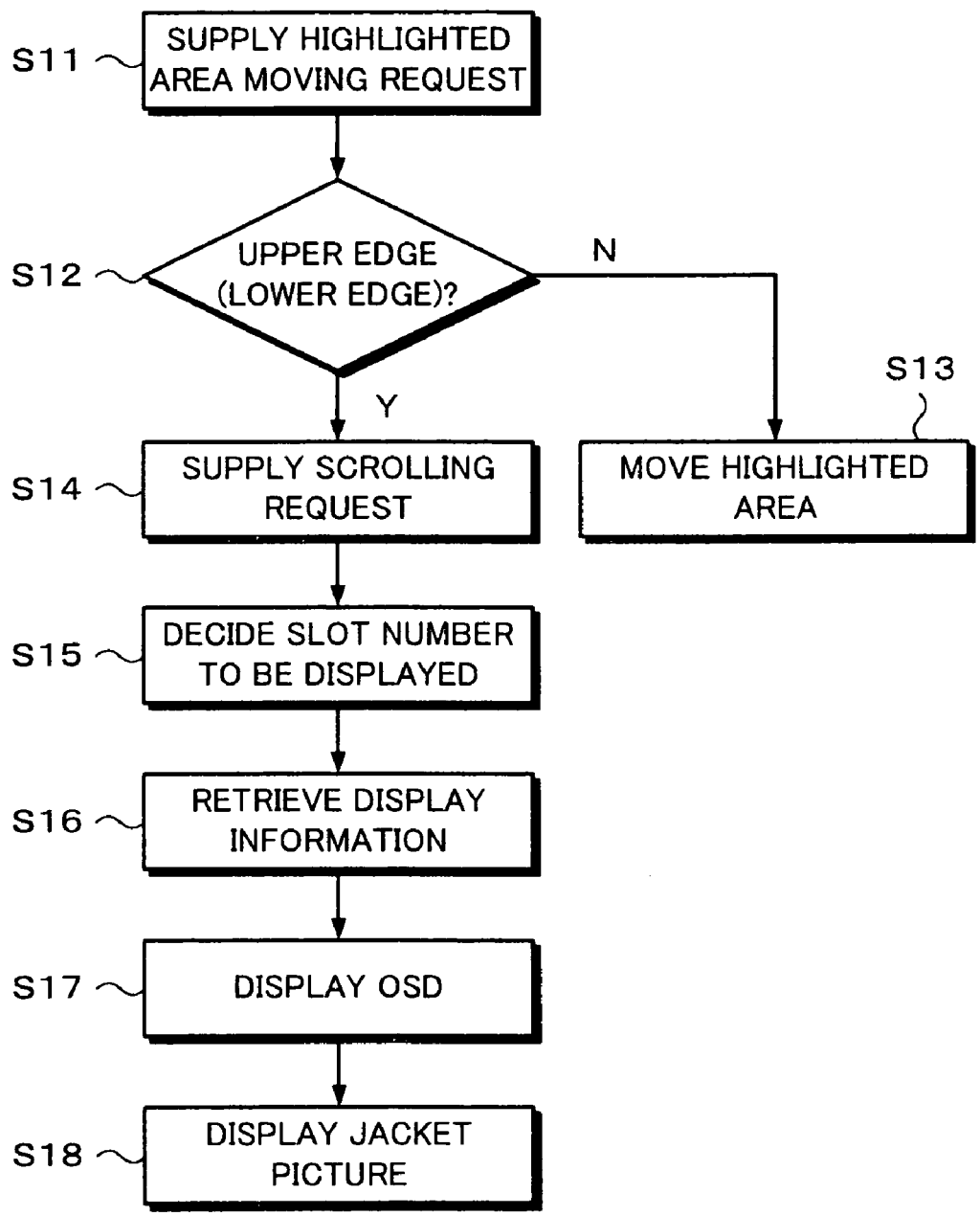
FIG. 7 is a flow chart for explaining a jacket picture displaying process according to the embodiment of the present invention.
Figure 8:
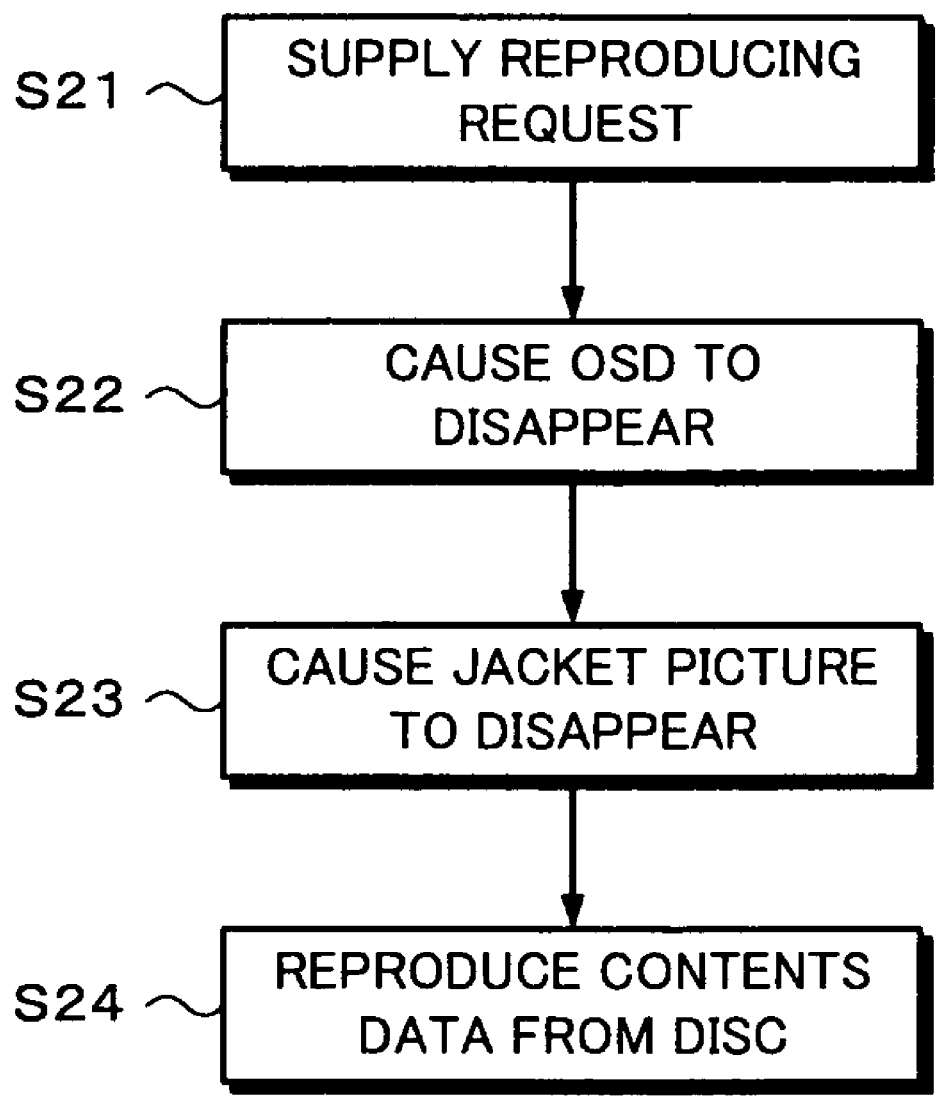
FIG. 8 is a flow chart for explaining a disc reproducing process on the GUI according to the embodiment of the present invention.

To move a highlighted area, an operation corresponding to a flow chart shown in FIG. 7 is performed. Since a highlighted area represents a disc for which a reproducing operation or an editing operation is performed, by moving a highlighted area, a disc selecting operation is performed. At step S11, the user interface 20 (for example, the commander of the remote controller) generates a highlighted area moving request.

At step S12, it is determined whether or not the highlighted area is at the upper edge or the lower edge of the displaying area. When the determined result at step S12 is No, the flow advances to step S13. At step S13, the highlighted area is moved up or down. The highlighted area is moved by the user with a move key of the user interface 20. Corresponding to the operation of the move key, the controller 19 controls the OSD portion 30 through the OSD displaying portion 23 so as to move the highlighted area on the screen.

When the highlighted area moving request is issued, if the highlighted area is at the upper edge (lower edge) (namely, the determined result at step S12 is Yes), the flow advances to step S14. At step S14, the user interface supplies a scrolling request to the controller 19. The scrolling operation is performed at step S15 (deciding a scroll number to be displayed), step S16 (retrieving display information), step S17 (displaying OSD), and step S18 (displaying a jacket picture). Steps S16 to S18 shown in FIG. 6 correspond to steps S2 to S5 shown in FIG. 4, respectively. In other words, display information shown in FIG. 6 is substituted with that of an earlier slot number or a later slot number.

By moving a highlighted area, the user can select his or her desired disc from which contents data is reproduced. After selecting a disc, the user presses an enter key of the user interface 20. Thus, the flow advances to step S21 (supplying a reproduction request for a selected disc).

When the controller 19 has received the reproduction request, the flow advances to step S22. At step S22, the controller 19 supplies a display off request to the OSD displaying portion 23. In addition, the controller 19 controls the servo portion 6 and so forth so as to reproduce contents data from the selected disc. Thereafter, the flow advances to step S23. At step S23, the controller 19 supplies a command that causes a jacket picture to disappear to the jacket picture displaying portion 23. Thus, the jacket picture disappears. Thereafter, the flow advances to step S24. At step S24, contents data is reproduced from the selected disc.

Figure 9:
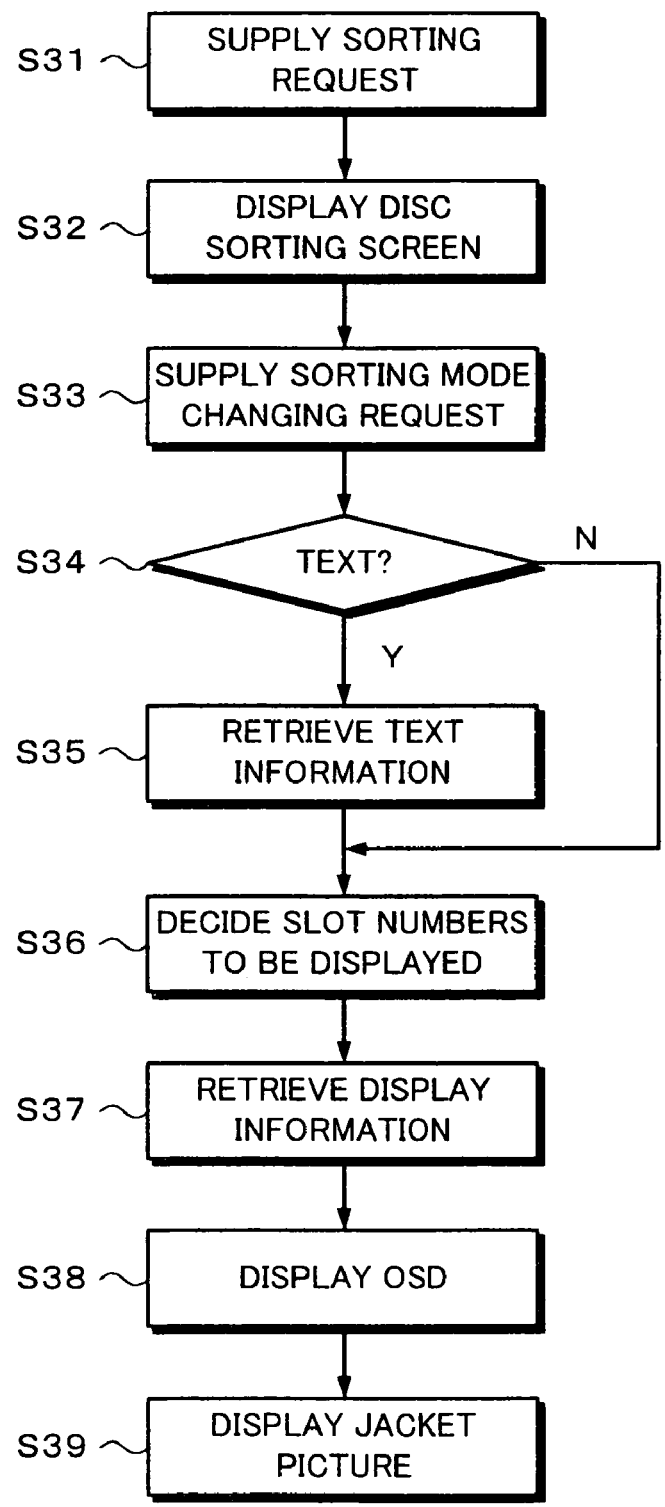
FIG. 9 is a flow chart for explaining a sorting process according to the embodiment of the present invention.
Figure 10:
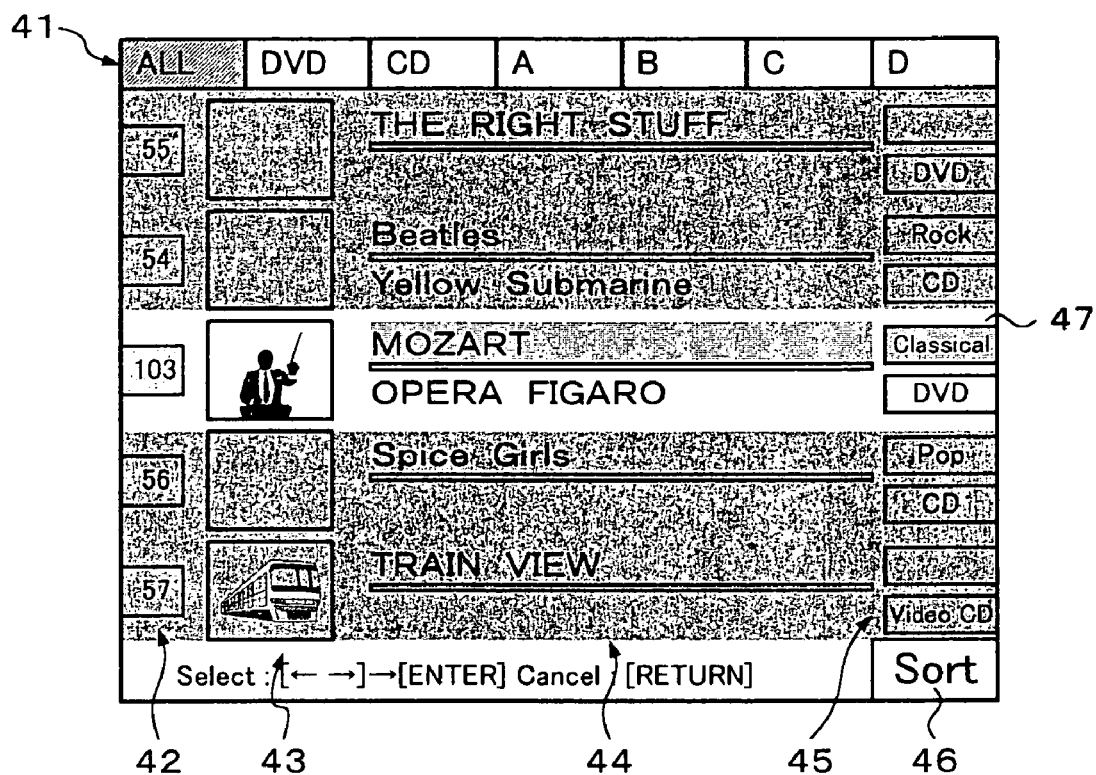
FIG. 10 is a schematic diagram showing an example of a screen for explaining the sorting process according to the embodiment of the present invention.

Next, with reference to FIGS. 9 and 10, a sorting function according to the embodiment of the present invention will be described. In the state that the GUI screen shown in FIG. 6 is displayed, the user interface 20 generates a sorting request (at step S31 shown in FIG. 9). When the controller 19 has received the sorting request, the controller 19 controls the OSD portion 23 so as to display a disc sorting screen as shown in FIG. 10. When the disc sorting screen is displayed, the mode area 46 represents the sorting mode. In the example shown in FIG. 10, a highlighted area 47 represents a slot number "103", whereas the other areas are masked.

As was described above, there are three types of sorting modes that are slot number sorting mode, text sorting mode, and genre sorting mode. In the example shown in FIG. 10, the slot number sorting mode is selected. At step S33, the user inputs a sorting mode changing request with the user interface 20. At step S34, it is determined whether or not the sorting mode is the text sorting mode. When the determined result at step S34 is Yes (namely, the sorting mode is the text sorting mode), the flow advances to step S34. At step S34, the controller 19 retrieves text information from the memory (at step S35).

At step S36, the controller 19 decides slot numbers to be displayed corresponding to the current folder information and the selected sorting mode. The controller 19 retrieves display information corresponding to the decided slot numbers from the memory (at step S37).

The controller 19 controls the memory portion 21, the jacket picture displaying controller 22, and the OSD displaying portion 23 corresponding to the decided slot numbers and the retrieved display information. The OSD displaying portion 23 displays frames, disc types, genre setup, text information, and a highlighted area as an OSD (at step S38). The OSD corresponds to the changed sorting mode. In addition, a jacket picture corresponding to jacket picture data retrieved from the memory portion 21 is displayed (at step S39).

Next, with reference to FIGS. 11, 12, and 13, a memo editing function according to the embodiment of the present invention will be described. The memo editing function allows the user to input a text and a genre of a disc even if text information has not been recorded thereon. In the state that the GUI screen shown in FIG. 6 is displayed, the user interface 20 generates an editing request (at step S41 shown in FIG. 11). When the controller 19 has received the editing request, the controller 19 supplies an editing mode and a disc information inputting screen displaying request. There are three types of editing modes that are a text information editing mode, a genre editing mode, and a folder name editing mode.

FIG. 12 shows an edit information inputting screen that is a text information inputting screen. FIG. 13 shows a genre setting screen. With one of these inputting screens or another inputting screen, the user can input a folder name (that is a name of each folder denoted by A to D).

On the text information inputting screen shown in FIG. 12, as a disc to which a text is input, the selected slot number is for example "30" and the mode displaying area 46 represents the editing mode. In addition, a text information inputting field 48 is displayed. Below the text information inputting field 48, an alphanumeric character inputting soft keyboard 49 is displayed. With the move key and the enter key, the user inputs characters on the soft keyboard 49 so as to input text information of a desired disc. Alternatively, the user can input a text with a real keyboard connected to the reproducing apparatus instead of the soft keyboard.

Figure 13:
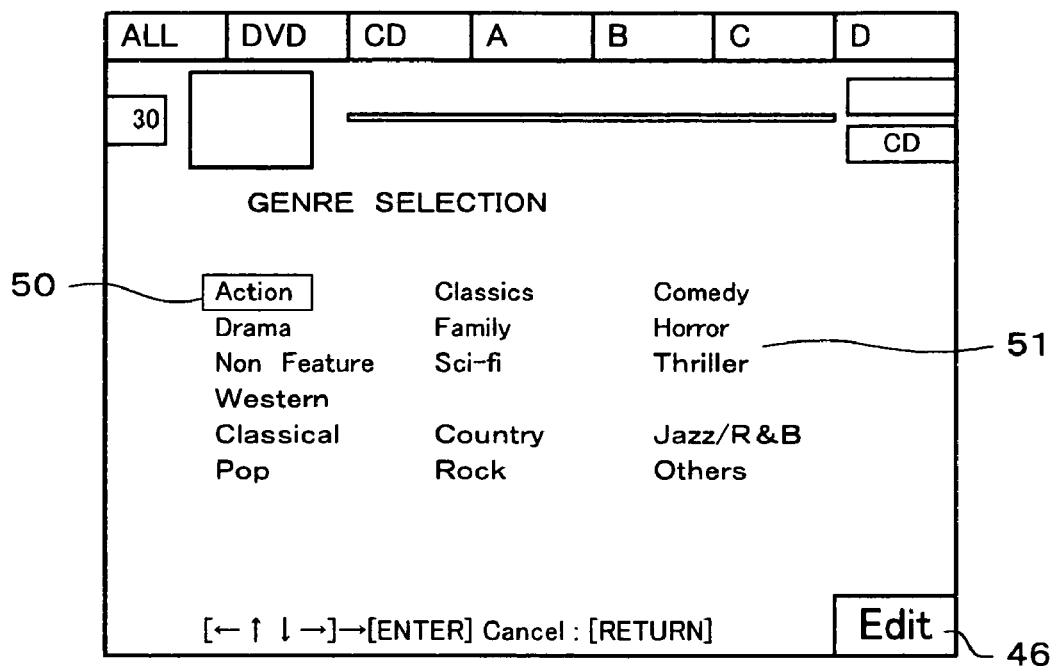
FIG. 13 is a schematic diagram showing an example of a screen for explaining a genre setting process according to the embodiment of the present invention.

On the genre setting screen shown in FIG. 13, a genre list 51 is displayed. By moving a cursor to a desired genre in the genre list 51 and operating the enter key, a genre setting operation is performed.

Figure 11:
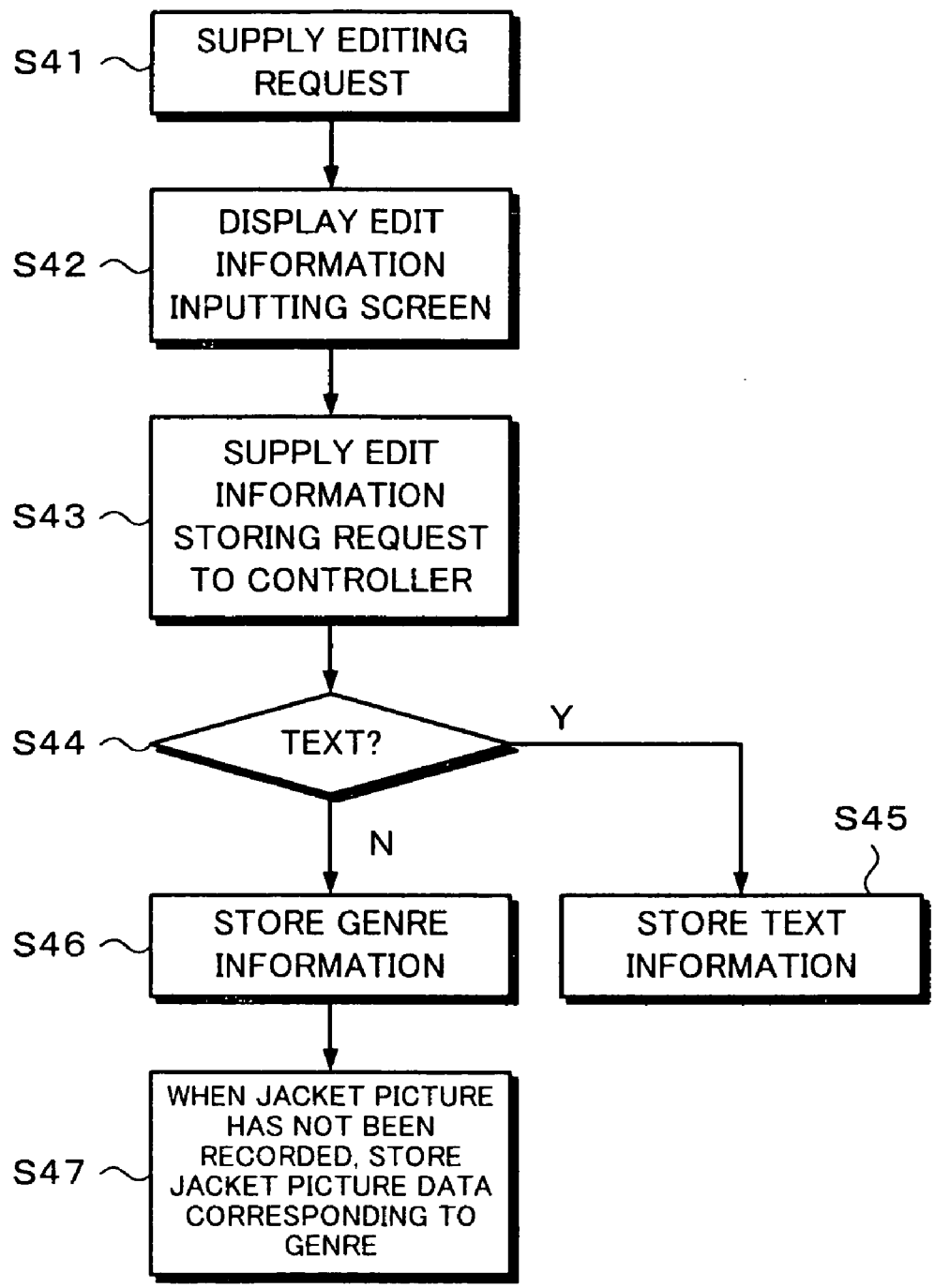
FIG. 11 is a flow chart for explaining an edit information inputting process according to the embodiment of the present invention.

At step S43 shown in FIG. 11, after the text inputting operation, the genre setting operation, and the folder name inputting operation have been completed, the user interface 20 supplies an edit information storing request to the controller 19. Thereafter, the flow advances to step S44. At step S44, the controller 19 determines whether or not a text has been input. When the determined result at step S44 is Yes (namely, a text has been input), the flow advances to step S45. At step S45, the input text is stored.

When the determined result at step S44 is No (namely, the genre setting operation has been performed instead of the text inputting operation), genre information is stored (at step S46). In the case that the genre setting operation is performed, if a jacket picture has not been recorded to the selected disc, the flow advances to step S47. At step S47, a jacket picture corresponding to the genre that has been set is stored. In the reproducing system shown in FIG. 1, for example 16 types of picture data corresponding to genres that have been categorized have been stored to the memory portion 21. One picture is selected corresponding to the genre that has been set and stored as a jacket picture of the selected disc. In this case, if the selected disc is for example a DVD or a video CD on which picture contents data has been recorded, a part of the picture contents data thereof may be recorded as a jacket picture.

Figure 14:
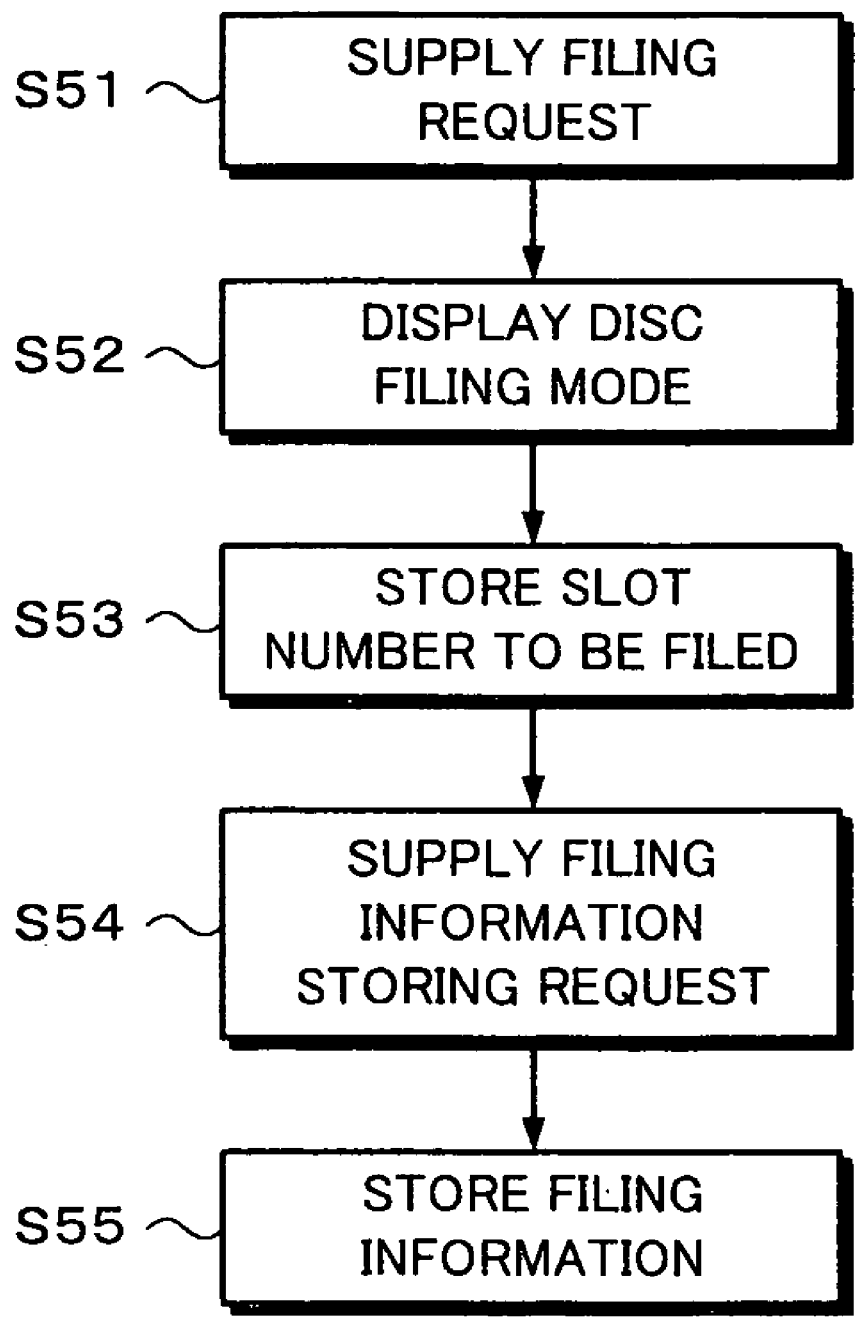
FIG. 14 is a flow chart for explaining a slot registering process for a filing process according to the embodiment of the present invention.
Figure 15:
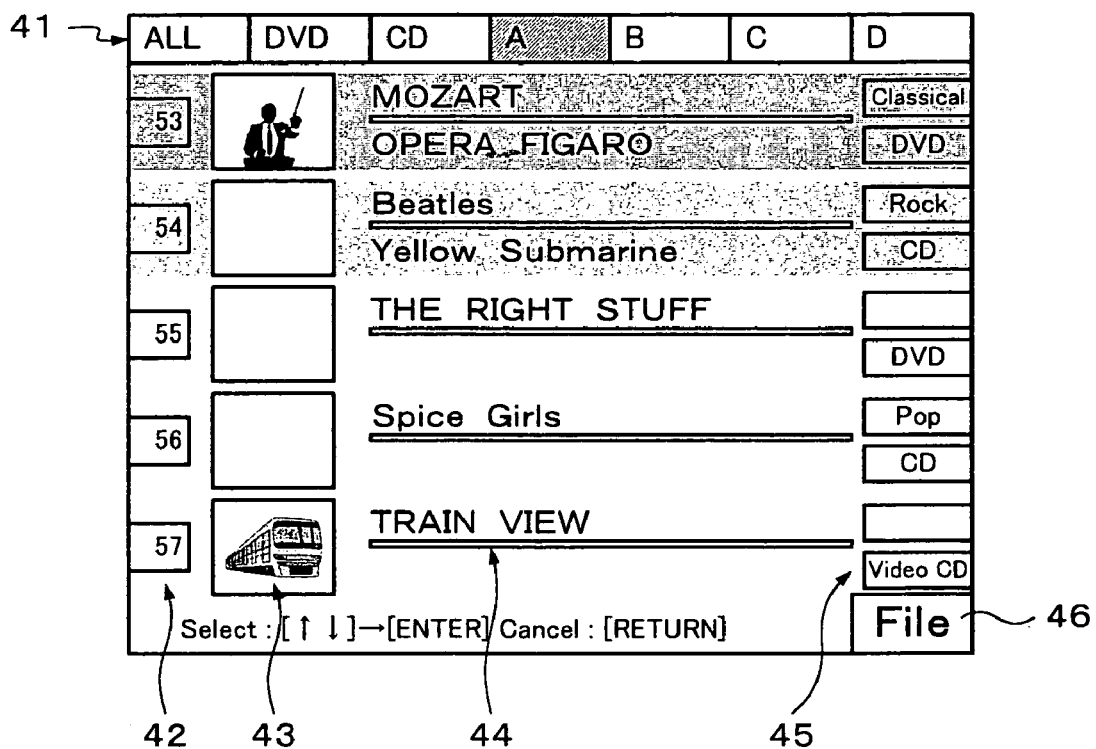
FIG. 15 is a schematic diagram showing an example of a screen for explaining the filing process according to the embodiment of the present invention.
Figure 16:
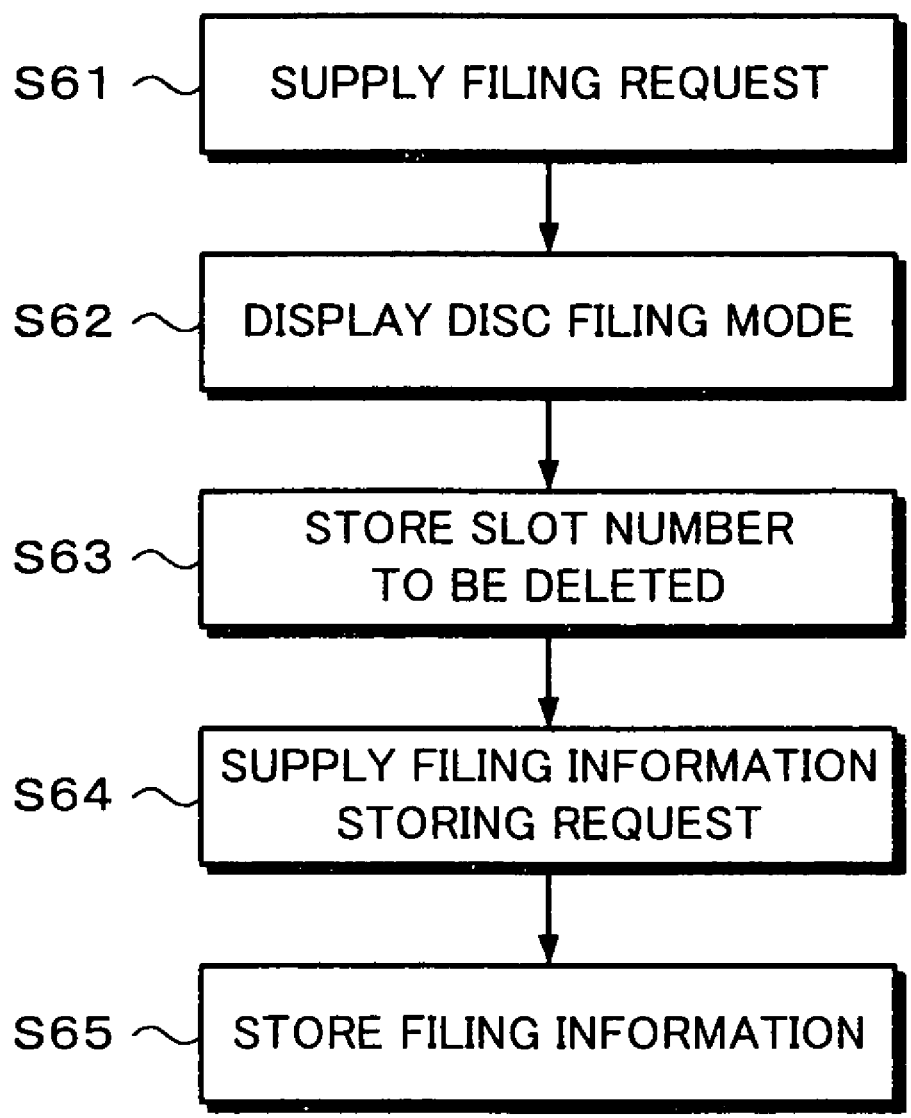
FIG. 16 is a flow chart for explaining a slot deleting process for the filing process according to the embodiment of the present invention.

Next, with reference to FIGS. 14, 15, and 16, a filing function for correlating the discs will be described. The filtering function is performed for easily managing all discs accommodated in the disc accommodating portion 2 shown in FIG. 1. In the state that the GUI screen shown in FIG. 6 is displayed, the user interface 20 generates a filing request (at step S51 shown in FIG. 14). When the controller 19 receives the filing request, the controller 19 supplies a disc filing mode displaying request to the OSD displaying portion 23. Thus, the OSD displaying portion 23 displays a disc filing mode screen as shown in FIG. 15. In FIG. 15, a selected folder (for example, folder A) is highlighted in the folder area 41.

At step S53, a slot number to be filed is stored. For example, on the screen shown in FIG. 15, with the move key, the user moves the highlighted slot number. At a desired slot number, the user presses the enter key as the slot number decision key. Thus, the slot number is stored. For example, the highlighted portion is displayed in yellow, whereas the stored slot number is displayed in gray. When the user repeats the filing operation, slot numbers are successively stored to individual folders.

At step S54, when the user presses the enter key, a slot number to be filed is decided. In addition, a filing request is generated. The filing request causes filing information composed of a slot number and folder information to be stored. The controller 19 stores the filing information to the memory (at step S55). In such a manner, a slot number to be filed to a folder (for example, folder A) is registered.

Next, with reference to a flow chart shown in FIG. 16, a process for deleting a registered slot number will be described. As with the above-described slot number registering process, in the state that the GUI screen shown in FIG. 6 is displayed, the use interface 20 generates a filing request (at step S61 shown in FIG. 16). Thus, a disc filing mode screen as shown in FIG. 15 is displayed. In the example shown in FIG. 15, a process for deleting a slot number from the folder A is performed.

At step S63, with the move key and the enter key, the user selects a slot number to be deleted. The selected slot number is stored. Thereafter, the flow advances to step S64. At step S64, a storing request for filing information is generated. The filing information is composed of a folder and a slot number to be deleted. When the controller 19 receives the storing request, the controller 19 updates the filing information so that the selected filing information is deleted from the stored filing information (at step S65).

With the above-described filing function, the filing information is stored. Thus, only information of a disc correlated with a particular folder can be displayed. For the folders A to D, discs can be filed corresponding to slot numbers. However, for the other folders "ALL", "DVD", and "CD", discs are automatically filed corresponding to the disc type information.

According to the present invention, not only a text (including a memo that is input by the user), but picture information such as a jacket picture and a picture corresponding to a genre are used and presented to the user through a GUI. Thus, the visibility of information of many discs accommodated to the reproducing apparatus can be remarkably improved.

In addition, according to the present invention, by combining the text inputting function, the genre setting function, the sorting function, and the filing function, to the GUI, the managing function for discs accommodated in the reproducing apparatus is improved. Thus, the user can much easily perform for example operations for searching what disc is accommodated to what slot and searching a disc for which he or she wants to watch and/or listen to contents data than the conventional changer players.

In addition, the GUI is not a simple state displaying function, but a function that allows the user to select his or her desired disc. Thus, a user-friendly operation environment can be accomplished.

It should be noted that the present invention is not limited to the above-described embodiment. Instead, within the scope of the present invention, various modifications and changes of the present invention are available. As a displaying portion that displays for example a GUI screen, a displaying unit such as an LCD integrated with a reproducing apparatus may be used instead of a monitor that displays information reproduced from a disc. In addition, the present invention is not limited to a reproducing apparatus. Instead, the present invention can be applied to a searching apparatus having a searching function for searching a desired one from many discs. Moreover, the present invention can be applied to recordable discs as well as reproduction only discs. In this case, recorded information can be handled in the above-described manner.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A reproducing apparatus, capable of holding at least one record medium on which contents data and related information thereof are recorded, for handling the contents data and the related information, the record medium removably attachable to the reproducing apparatus, the reproducing apparatus comprising:

reading means for reading the related information from the record medium;

sorting means for sorting the related information based on a current sorting mode for sorting the related information according to category or state of the contents data, wherein said current sorting mode is configured to be one of a disc number sorting mode, a text sorting mode, and a genre sorting mode;

storing means for storing filing information composed of a slot number and folder information and the related information and the current sorting mode, wherein the related information is divided into a plurality of portions so as to manage said related information with a plurality of folders;

editing means for inputting text information, a genre, and a folder name; and graphical user interface means for controlling displaying means in order to display the sorted related information, said graphical user interface means providing a capability to associate the current sorting mode to the record medium and to maintain the current sorting mode.

2. The reproducing apparatus as set forth in claim 1, wherein the record medium is a disc shaped record medium, and wherein the related information is displayed on the displaying means of said graphical user interface means corresponding to the accommodated position of at least one disc shaped record medium.

3. The reproducing apparatus as set forth in claim 2, wherein the sorting means sorts a plurality of entries of the related information according to the accommodated positions of the disc shaped record mediums.

4. The reproducing apparatus as set forth in claim 1, wherein the related information is picture information recorded to the record medium, and wherein the picture information is stored to said storing means and displayed on the displaying means.

5. The reproducing apparatus as set forth in claim 1, wherein the related information is text information, and wherein the text information is stored in said storing means and displayed on the displaying means.

6. The reproducing apparatus as set forth in claim 5, wherein the sorting means sorts a plurality of entries of the related information according to the text information.

7. The reproducing apparatus as set forth in claim 5, wherein text information is input through said graphical user interface means.

8. The reproducing apparatus as set forth in claim 1, wherein the related information is genre information, and wherein the genre information is stored in said storing means and displayed on the displaying means.

9. The reproducing apparatus as set forth in claim 8, wherein the sorting means sorts a plurality of entries of the related information according to the genre information.

10. The reproducing apparatus as set forth in claim 8, wherein the genre information is set up through said graphical user interface means.

11. The reproducing apparatus as set forth in claim 10, wherein picture information corresponding to the genre information that is set up through said graphical user interface means is displayed as related information.

12. The reproducing apparatus as set forth in claim 1, wherein the related information is record medium type information, and wherein the record medium type information is stored in said storing means and displayed on the displaying means.

13. The reproducing apparatus as set forth in claim 12, wherein the sorting means sorts a plurality of entries of the related information according to the record medium type information.

14. The reproducing apparatus as set forth in claim 1, wherein the related information is displayed for each folder on the displaying means of said graphical user interface means.

15. The reproducing apparatus as set forth in claim 1, wherein the contents data is reproduced from a record medium designated corresponding to the related information displayed on the displaying means of said graphical user interface means.

16. A reproducing method of a reproducing apparatus, capable of holding at least one record medium on which contents data and related information thereof are recorded, for handling the contents data and the related information, the record medium removably attachable to the reproducing apparatus, the reproducing method comprising:

reading the related information from the record medium;

sorting the related information based on a current sorting mode for sorting the related information according to category or state of the contents data,
wherein said current sorting mode is configured to be one of a disc number sorting mode, a text sorting mode, and a genre sorting mode;

storing the related information and the current sorting mode;

storing and registering filing information composed of a slot number and folder information;

dividing the related information into a plurality of portions so as to manage said related information with a plurality of folders;

using an editing function to input text information, a genre, and a folder name; and controlling displaying in order to display the sorted related information with a graphical user interface, which provides a capability to associate the current sorting mode to the record medium and to maintain the current sorting mode.

17. The reproducing method as set forth in claim 16, wherein the record medium is a disc shaped record medium, and wherein the related information is displayed on the graphical user interface corresponding to the accommodated position of at least one disc shaped record medium.

18. The reproducing method as set forth in claim 17, wherein a plurality of entries of the related information that are sorted according to the accommodated positions of the disc shaped record mediums are displayed.

19. The reproducing method as set forth in claim 16, wherein the related information is picture information recorded to the record medium, and wherein the picture information is displayed on the graphical user interface.

20. The reproducing method as set forth in claim 16, wherein the related information is text information, and wherein the text information is displayed on the graphical user interface.

21. The reproducing method as set forth in claim 20, wherein a plurality of entries of the related information that are sorted according to the text information are displayed on the user graphical interface.

22. The reproducing method as set forth in claim 20, wherein text information is input through the graphical user interface.

23. The reproducing method as set forth in claim 16, wherein the related information is genre information, and wherein the genre information is displayed on the graphical user interface.

24. The reproducing method as set forth in claim 23, wherein a plurality of entries of the related information that are sorted according to the genre information are displayed on the graphical user interface.

25. The reproducing method as set forth in claim 23, wherein the genre information is set up through the graphical user interface.

26. The reproducing method as set forth in claim 23, wherein picture information corresponding to the genre information that is set up through the graphical user interface is displayed as related information.

27. The reproducing method as set forth in claim 16, wherein the related information is record medium type information, and wherein the record medium type information is displayed on the graphical user interface.

28. The reproducing method as set forth in claim 27, wherein a plurality of entries of the related information that are sorted according to the record medium type information are displayed on the graphical user interface.

29. The reproducing method as set forth in claim 16, wherein the related information is displayed for each folder on the graphical user interface.

30. The reproducing method as set forth in claim 16, wherein the contents data is reproduced from a record medium designated corresponding to the related information displayed on the graphical user interface.

* * * * *